March 22, 1932.   G. A. COUNTRYMAN   1,850,073
AUTOMOBILE REPAIR TOOL
Filed July 12, 1930   4 Sheets-Sheet 1
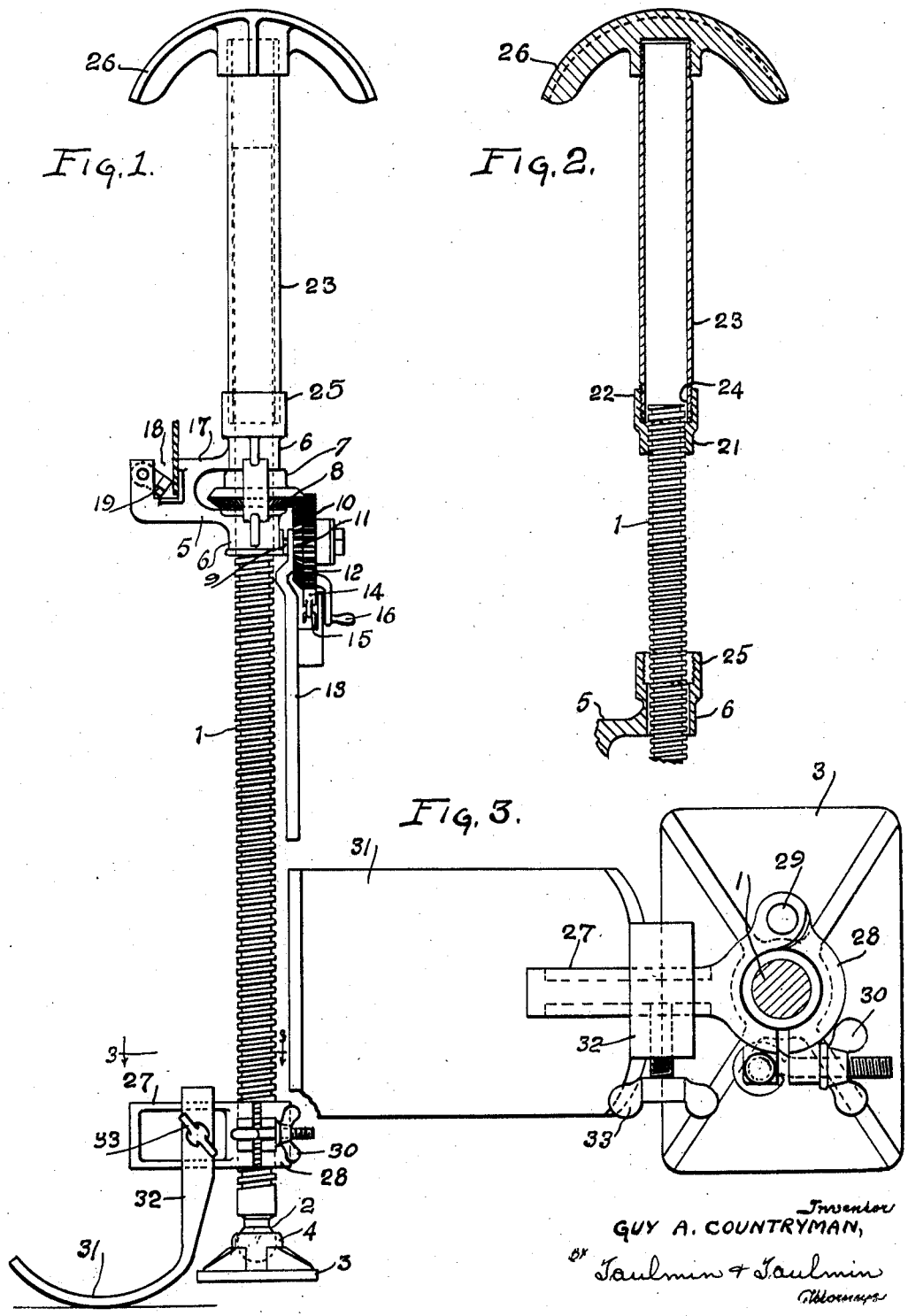
Inventor
GUY A. COUNTRYMAN,
by Taulmin & Taulmin
Attorneys

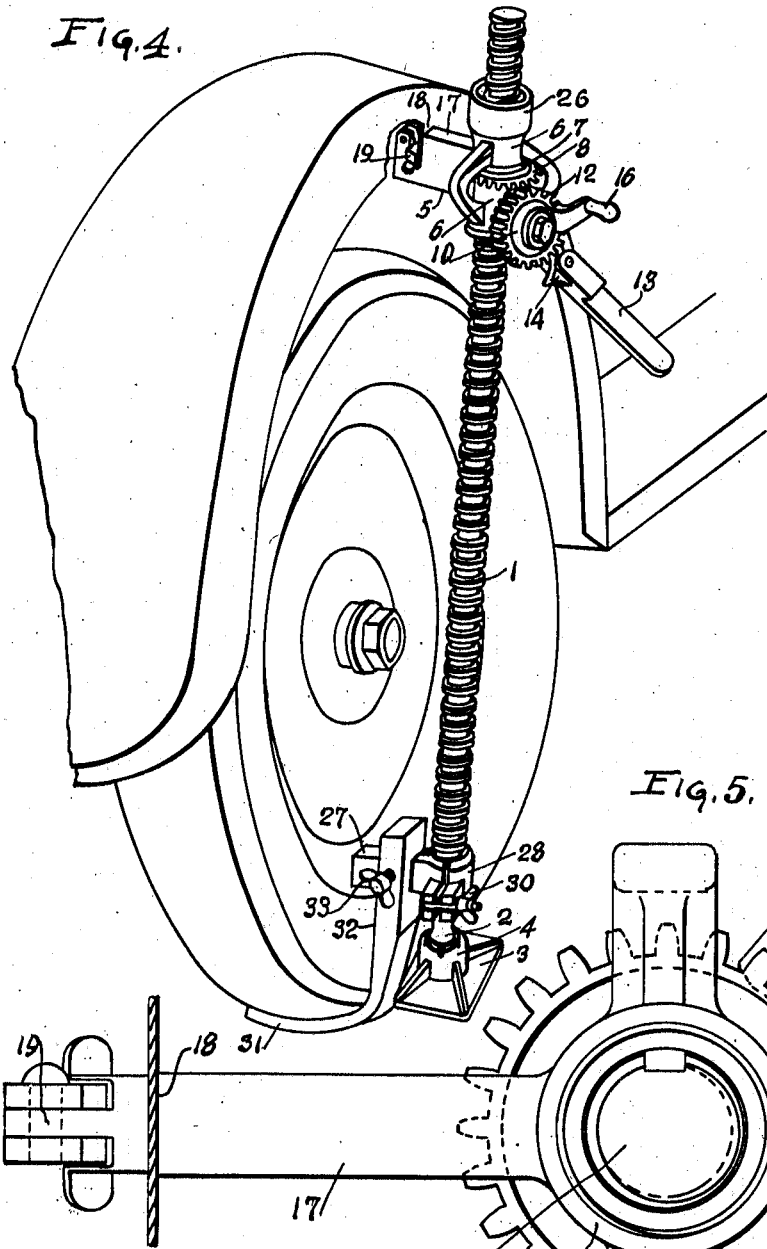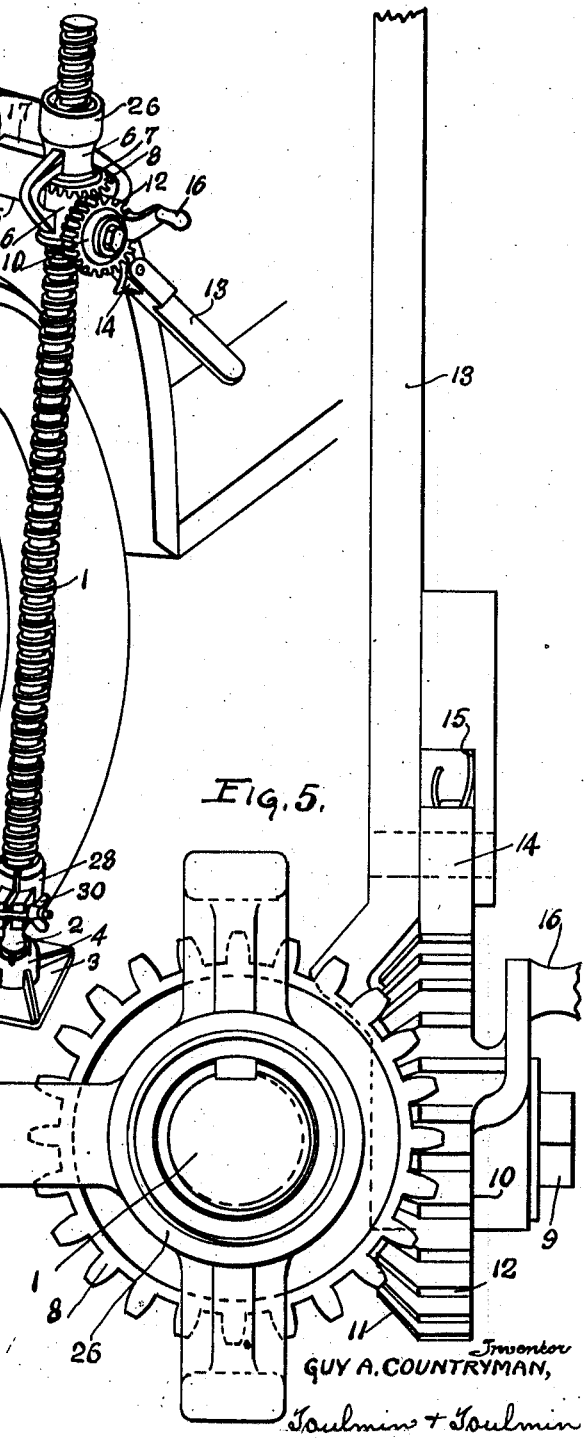

March 22, 1932.     G. A. COUNTRYMAN     1,850,073
AUTOMOBILE REPAIR TOOL
Filed July 12, 1930     4 Sheets-Sheet 3
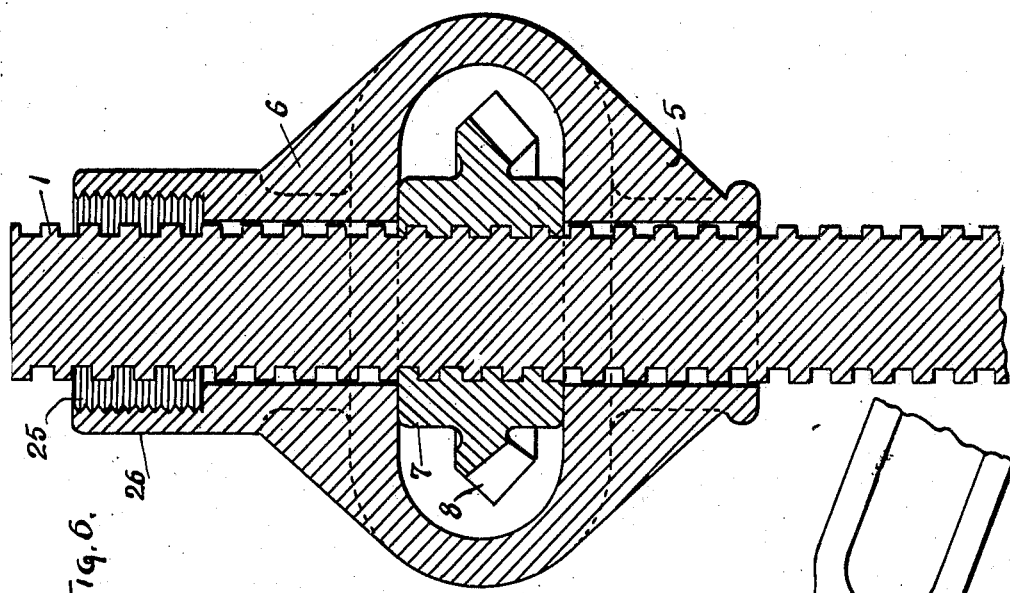
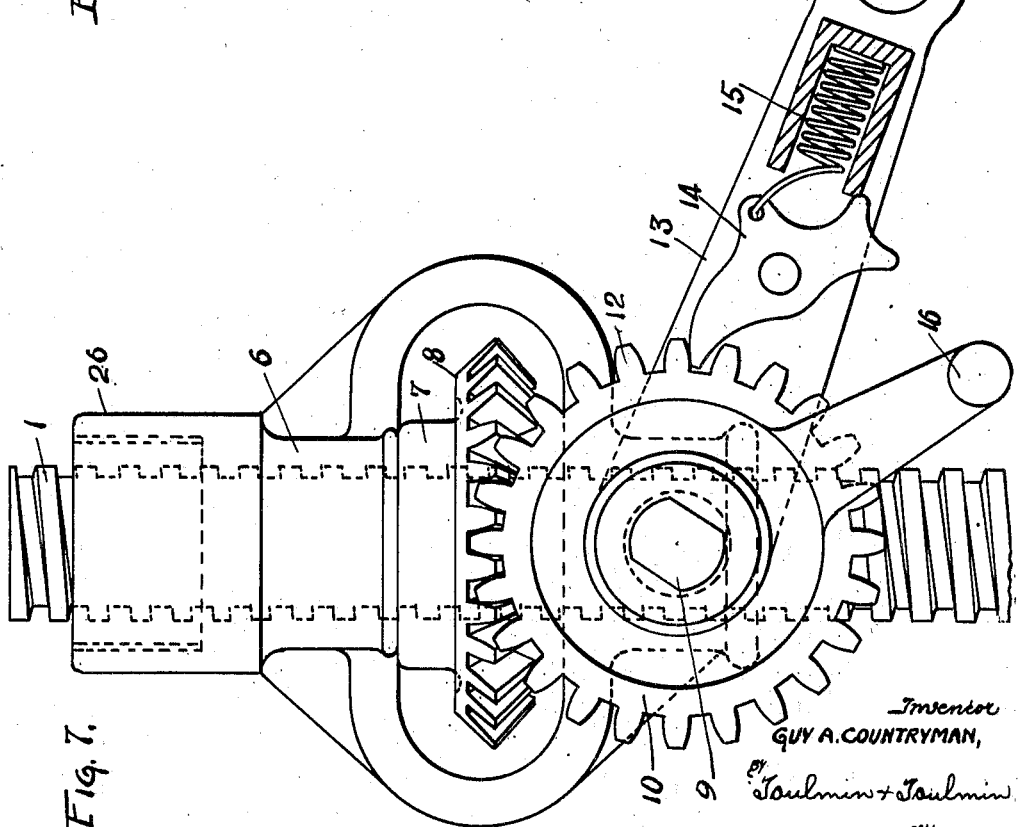
Inventor
GUY A. COUNTRYMAN,
By Toulmin + Toulmin
Attorneys March 22, 1932.  G. A. COUNTRYMAN  1,850,073
AUTOMOBILE REPAIR TOOL
Filed July 12, 1930   4 Sheets-Sheet 4
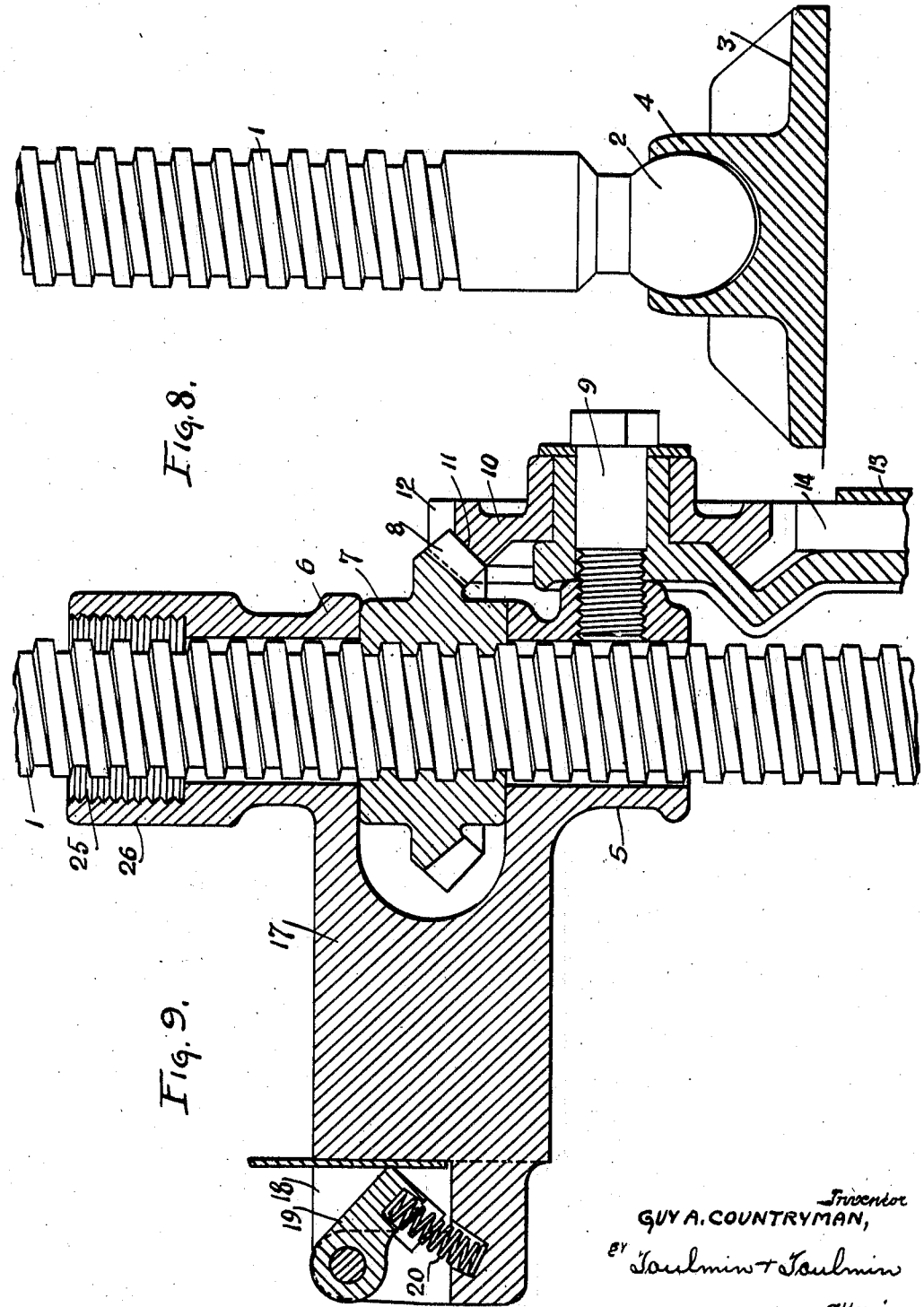
Inventor
GUY A. COUNTRYMAN,
BY Toulmin + Toulmin
Attorneys Patented Mar. 22, 1932

1,850,073

UNITED STATES PATENT OFFICE.

GUY A. COUNTRYMAN, OF ASHLAND, OHIO

AUTOMOBILE REPAIR TOOL

Application filed July 12, 1930. Serial No. 467,422.

This invention relates to repair tools for use in combination with automobiles for the purpose of straightening the fender or other parts of the body of an automobile.

The invention particularly relates to means for attaching one work-engaging means to a movable housing in such a manner that this work-engaging means can be readily removed from the rod that supports the operating mechanism or be placed thereon in contact with the movable member for operation upon the work.

It is a further object of this invention to provide, in connection with a rod, means on one end thereof for engaging the tire of an automobile wheel.

It is particularly the object to provide a tire-engaging means that is adjustable laterally and longitudinally of the operating rod and that may be also adjusted rotatably about the rod.

These and other objects will appear from the following description taken in connection with the drawings.

Referring to the drawings:

Figure 1 is a view of the complete tool with all the parts.

Figure 2 is a sectional view through the upper end of the apparatus as shown in Figure 1.

Figure 3 is a cross section on the line 3—3 of Figure 1.

Figure 4 is a view showing the apparatus attached to an automobile, with the tire-engaging hook beneath the tire and the fender-engaging means in engagement with a fender.

Figure 5 is an end view of the apparatus as shown in Figure 4, with part of a fender in engagement with the fender-engaging arm.

Figure 6 is a longitudinal section through the operating housing.

Figure 7 is a side elevation showing the housing and the means for moving the housing longitudinally of the supporting screw rod.

Figure 8 is a sectional view through the foot supporting the lower end of the screw rod.

Figure 9 is a longitudinal section through the housing showing the operating mechanism for moving the housing longitudinally of the rod, and showing the fender-gripping means in operation.

The numeral 1 is used to designate a supporting and operating rod, which is in the present instance, screw threaded. However, a round rod not screw threaded may be used, the invention lying chiefly in the means for holding the tire of a wheel, gripping the fender and moving the parts with relation to each other. On the lower end of the rod there is a ball 2 which is suitably mounted in a socket in a foot 3 for free swinging movement on one end of the rod. This socket is indicated by the numeral 4.

Mounted upon the rod for movement longitudinally thereof is a housing 5. This housing is U-shaped in structure, having two arms 6. The upper of these arms is slightly enlarged to provide a screw threaded socket later to be described. Between the two arms of the housing is a nut 7, in the present instance threaded upon the rod so that whenever the nut rotates the rod will move longitudinally of the housing, or the housing will move longitudinally of the rod. This nut 7 has on the outer periphery thereof gear teeth 8 by which the nut is rotated for moving the housing along the rod.

Extending from one of the arms of the U-shaped housing is a shaft 9, upon which there is rotatably mounted a gear wheel 10 which has teeth 11 meshing with the teeth 8 on the nut 7. Adjacent the teeth 11 and on the outer periphery of the gear wheel 10 are ratchet teeth 12. Suitably mounted upon the shaft 9 is an operating lever 13 which has mounted thereon a double pawl 14 for engaging the ratchet teeth for rotating the gear 10 and with it the nut 7 so that the housing may be moved along the rod. The pawl 14 is held in engagement with the ratchet teeth by means of a spring 15. The pawl and spring are so related to each other that the spring will hold the pawl in either of two positions so that the gear 10 may be rotated in either of two directions.

In order that the gear 10 may be rapidly rotated there is provided a handle 16 projecting from one edge thereof. Constituting a part of the housing and projecting therefrom is a work arm 17 which has a slot 18 therein for receiving the work to be operated on. Within this slot and suitably pivoted to the arm 17 is a dog 19. This dog cooperates with one side of the slot 18 for gripping and holding within the slot the article worked upon, usually a fender or some other part of an automobile. For holding this dog in gripping position there is provided a spring 20, shown in Figure 9.

For the purpose of providing an extension on one end of the screw rod there is shown a cuff member, which has a threaded small end 21 to engage the threads of the screw rod, and a threaded larger end 22 to engage a threaded end of a pipe or tube 23. The threaded end of this pipe is indicated by the numeral 24 and is adapted to be threaded into the larger end of the cuff member, or into a screw threaded socket 25 in the upper end of the housing. By this means the tube or pipe 23 may be supported as shown in Figure 2, on the extreme threaded end of the rod, by using the cuff member. If the cuff member is removed the threaded end 24 of the pipe or tube 23 may be threaded into the threaded socket 25 of the housing. In this position the pipe 23 travels with the housing as shown in Figure 1. When the pipe is attached to the end of the rod it is stationary with the rod, or moves with the rod. On the other end of the pipe or tube 23 from the threads 24 is a work-engaging head 26, which in the present instance is shown to be arc-shaped, but any other suitable form or shape of head may be used.

Suitably attached between the arm 17 and the foot 3 is an arm 27, which has on one end thereof a clamping member 28 pivoted thereto at 29 and adapted to extend around the rod 1 and be clamped thereto by means of a screw 30. Upon this arm 27 is a tire-engaging shoe or stirrup member 31. This member is hook-shaped and has extending therefrom a shank 32 in which there is a slot of the same size and shape as the arm 27 so that the shank may readily fit over the arm and be clamped thereto by means of a screw 33.

The head 26 may be used in various connections and for various purposes. In the position shown in Figure 2 when the housing 5 is in engagement with any fixed object, the head 26 may be forced against a fender to straighten the fender by the operation of the nut 7. The head 26 may also be used as an anvil for hammering out kinks in a fender.

When the head 26 and the tube 23 are attached to the rod 1, in the manner shown in Figure 2, the head may be used as above described or it may be used in connection with the hook 31. The hook 31 may be reversed. This hook may be placed in engagement with any part of the wheel, the tire or the rim and the head 26 brought into contact with any part of the fender to be straightened. Since the head 26 is adjustably mounted on the rod 1 and the hook 31 is also adjustably mounted on the rod, they may be suitably adjusted so that the two parts may be used together. The head may be used at the same time the hook 31 and the housing 5 are used. The housing 5 and the hook 31 may be operated to grip some part of the automobile, while the head 26 on the end of the rod is held in fixed position and may be used for any desired purpose.

In Figure 4 this tool is shown applied to one wheel and a fender of an automobile. The hook-shaped shoe or stirrup member is broad and round, adapted to engage the outer periphery of a tire, and may be placed between the tire and wheel and the ground upon which the wheel rests. When in this position the fender-engaging arm 17 may be so located that the dog will engage a part of the fender. When the parts are positioned as shown in Figure 4 operation of the handle 13 will cause the housing to move longitudinally of the rod so that the fender may be pushed away from the shoe or pulled toward the shoe, owing to the operation of the handle 13 and the position of the pawl engaging the ratchet teeth. By adjusting the shoe longitudinally of the rod any size car may be repaired.

The shoe or stirrup member 31 may be placed in an inverted position from that shown in Figure 1, so that the shoe may be hooked over one edge of the wheel with any other part of the tool in engagement with a fender or any part thereof. Frequently when the shoe is in inverted position the round head may be used for pressing out and properly shaping a misshaped or bent part of a fender. This operation may be effected by the tool as shown in Figure 1, with the shoe in inverted position from that shown. Instead of being hooked up toward the housing it would be hooked down toward the foot. It is also possible to place the housing near the foot end of the screw rod with the arm 27 between the housing and the other end of the rod so that the arm 27 and the shoe 31 may be forced along by operating the nut 7, and when the hook 31 has been forced into proper position it may be clamped on the rod so that it will not move therefrom longitudinally thereof until the clamp has been released.

This tool is susceptible of various uses and may be attached to any part of the wheel tire and in any position thereon. It may be used for pulling or pushing purposes when attached to the wheel and the shoe 31 is properly adjusted.

I desire to comprehend within my invention such modifications as may be clearly embraced within my claims and the scope of my invention.

Having thus fully described my invention, what I claim is new and desire to secure by Letters Patent, is:

1. In combination with a non-rotatable screw, a gripper, a gripper carrying housing on said screw for longitudinal movement thereon, means for moving said housing on said screw, and a laterally adjustable hook-shaped tire-engaging member on said screw.

2. In combination with a non-rotatable screw, a housing on said screw for longitudinal movement thereon, a gripping member on said housing, means to move said housing on said screw, and an adjustable and reversible tire-engaging member on the screw.

3. In combination with a rod, a gripping member supported on said rod for longitudinal movement thereon, means to move said gripping member on said rod, and a reversible tire-engaging member attached to said rod and adjustable longitudinally thereof.

4. In combination with a rod, a fender-gripping member on said rod, means to move said gripping member along said rod, and a tire-engaging member on said rod and adjustable longitudinally and laterally of said rod.

5. In an automobile repair tool, in combination with a rod, a fender-clamping means on said rod, a broad flat curved tire-engaging shoe supported by said rod and adjustable laterally thereof, and means to move the clamping means and the shoe to and from each other.

6. In an automobile repair tool, in combination with a rod having a movable clamping member thereon, an arm adjustably attached to said rod, and a broad flat curved tire-engaging shoe adjustably mounted on said arm for lateral and longitudinal adjustment.

7. In an automobile repair tool, in combination with a rod having a movable clamping member thereon, an arm extending from said rod and rotatably and longitudinally adjustable thereon, and a broad flat tire-engaging member on said arm, said tire-engaging member having a shank with a slot therein to receive the arm.

8. In an automobile repair tool, in combination with a rod having a movable clamping member thereon, an arm, said arm having a hinged gripping member on one end thereof to adjustably grip said rod, and a broad flat tire-engaging member on said arm, said tire-engaging member having a shank with a slot therein to receive the arm.

9. In an automobile repair tool, in combination with a rod having a clamping member thereon, an arm, said arm having a hinged gripping member on one end to grip said rod for longitudinal and rotary adjustment thereon, and a curved flat tire-engaging member on said arm, said tire-engaging member having a shank with a slot therein to receive the arm.

10. In an automobile repair tool, in combination with a rod, a housing on said rod for longitudinal movement thereon, said housing having a threaded sleeve thereon around the rod, a pipe fitting over one end of said rod and threaded onto said sleeve, and a tire-engaging hook member on said rod.

11. In an automobile repair tool, in combination with a rod, a housing on said rod for longitudinal movement thereon, said housing having a threaded sleeve thereon around the rod, a pipe fitting over said rod in threaded engagement with the sleeve, and, a reversible tire-engaging hook member on said rod.

12. In an automobile repair tool, in combination with a rod, a housing on said rod for longitudinal movement thereon, said housing having a threaded sleeve thereon around the rod, a pipe fitting over said rod in threaded engagement with the sleeve, an arm mounted on said rod for longitudinal and rotary adjustment thereon, and a broad flat tire-engaging hook member having a shank with a slot therein to receive the arm.

13. In an automobile repair tool, in combination with a rod, a foot on said rod, a housing mounted on said rod for longitudinal movement thereon, said housing having a threaded sleeve thereon, a pipe having a work-engaging head at one end threaded at its other end to said sleeve, and means to move the housing and pipe longitudinally of the rod.

14. In an automobile repair tool, in combination with a screw, a housing on said screw and adapted to be moved longitudinally thereon, said housing having a threaded sleeve around the screw but spaced therefrom, a cuff member threaded at one end to engage the screw and threaded at the other end similar to the threaded sleeve, and a pipe having a work-engaging head at one end and threaded at the other end to engage either the cuff or the threaded sleeve.

15. In an automobile repair tool, in combination with a rod, an adjustable tire-engaging hook adjacent one end of said rod, a movable fender-clamping means mounted on said rod, and a pipe having a work-engaging head on one end fitting over the end of said rod with its other end resting upon the fender-clamping means and adapted to be moved therewith.

In testimony whereof, I affix my signature.
GUY A. COUNTRYMAN.